United States Patent [19]
Watanabe et al.

[11] Patent Number: 5,525,803
[45] Date of Patent: Jun. 11, 1996

[54] RADIATION SITE DETECTING APPARATUS

[75] Inventors: Mitsuo Watanabe; Hiroshi Uchida, both of Hamamatsu, Japan

[73] Assignee: Hamamatsu Photonics K.K., Hamamatsu, Japan

[21] Appl. No.: 285,286

[22] Filed: Aug. 3, 1994

[30] Foreign Application Priority Data

Aug. 4, 1993 [JP] Japan .................................. 5-193470

[51] Int. Cl.⁶ ................................................... G01T 1/164
[52] U.S. Cl. ..................................... 250/369; 250/363.03
[58] Field of Search .............................. 250/369, 363.03, 250/363.04; 364/413.24

[56] References Cited

U.S. PATENT DOCUMENTS 4,258,428  3/1981  Woronowicz .

FOREIGN PATENT DOCUMENTS 0117299  9/1984  European Pat. Off. .

OTHER PUBLICATIONS

Thompson, "The Effects of Detector Material and Structure on Pet Spatial Resolution and Efficiency", Montreal Neurological Institute, McGill University, Montreal, Quebec, Canada, 6 pages.

Lecomte et al, "Potentials of Multispectral Acquisition in Positron Emission Tomography", Department of Nuclear Medicine and Radiobiology, Universite de Sherbrooke, Quebec, Canada, J1H 5N4, 3 pages.

Cho et al, "Resolution and Sensitivity Improvement in Positron Emission Tomography by the First Interaction Point Determination", Department of Radiological Sciences, University of California, Irvine, CA 92717, pp. 1–12.

*Primary Examiner*—Davis L. Willis
*Assistant Examiner*—Richard Hanig
*Attorney, Agent, or Firm*—Cushman Darby & Cushman

[57] ABSTRACT

An object of the present invention is to provide a radiation site detector which can detect a position of an incident scintillator with high precision by excluding the effect of Compton scattering. The radiation site detector is provided with a scintillator array having a plurality of scintillators into which a radiation is made incident, and a photodetector for converting scintillations occurring in the scintillators to independent photoelectric conversion signals to output them. A level of each of photoelectric conversion signals output from a specific scintillator to be judged whether the radiation has been incident thereinto, and from a plurality of scintillators around the specific scintillator, is compared with a plurality of threshold values different from one another so as to determine whether the levels are within or outside a window defined by the threshold values. Then, it is judged whether the above specific scintillator is a scintillator into which the radiation has been incident based on the characteristics of a signal pattern obtained in the above comparison.

3 Claims, 12 Drawing Sheets

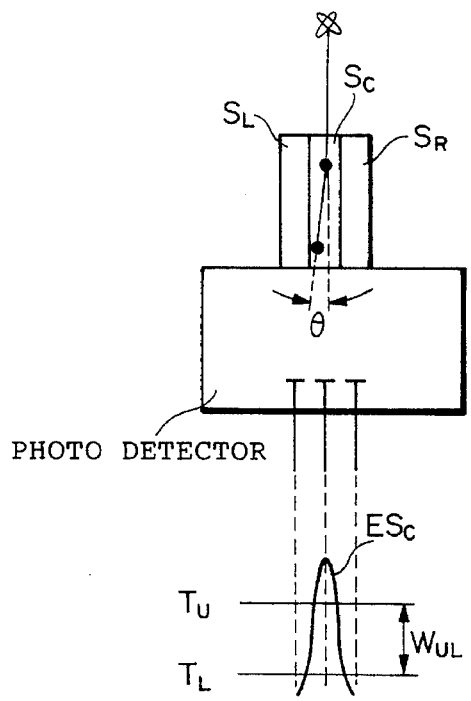
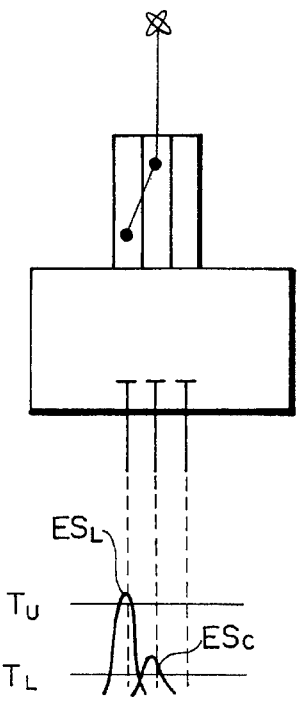
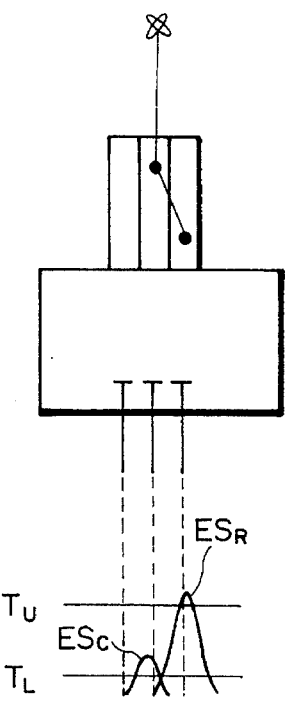
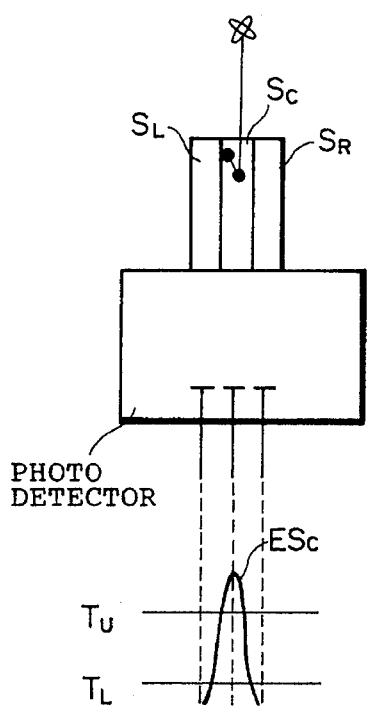
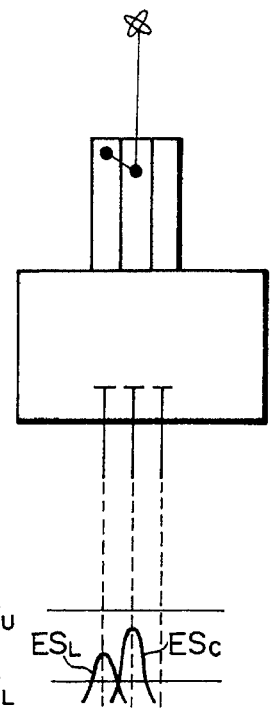
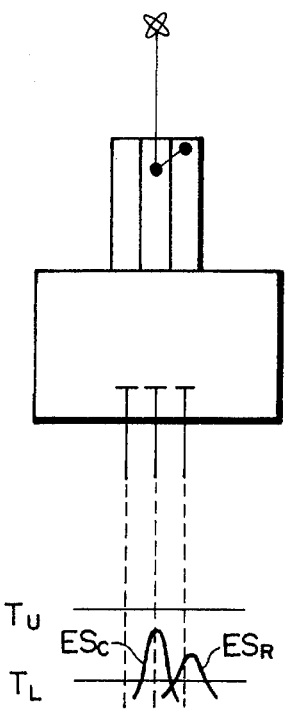

Fig. 5

| | JUDGMENT CONDITIONS | | | JUDGMENT RESULTS |
|---|---|---|---|---|
| EMISSION INTENSITY $ES_L$ OF LEFT SCINTILLATOR | EMISSION INTENSITY $ES_C$ OF INCIDENT SCINTILLATOR | EMISSION INTENSITY $ES_R$ OF RIGHT SCINTILLATOR | | |
| $ES_L < T_L$ | $T_U \leqq ES_C$ | $ES_R < T_L$ | | FORWARD COMPTON SCATTERING [THE CASE OF Fig.1A] |
| $T_U \leqq ES_L$ | $T_L \leqq ES_C < T_U$ | $ES_R < T_L$ | | FORWARD COMPTON SCATTERING [THE CASE OF Fig.1B] |
| $ES_L < T_L$ | $T_L \leqq ES_C < T_U$ | $T_U \leqq ES_R$ | | FORWARD COMPTON SCATTERING [THE CASE OF Fig.1C] |
| $ES_L < T_L$ | $T_U \leqq ES_C$ | $ES_R < T_L$ | | BACKWARD COMPTON SCATTERING [THE CASE OF Fig.2A] |
| $T_L \leqq ES_L < T_U$ | $T_L \leqq ES_C < T_U$ | $ES_R < T_L$ | | BACKWARD COMPTON SCATTERING [THE CASE OF Fig.2B] |
| $ES_L < T_L$ | $T_L \leqq ES_C < T_U$ | $T_L \leqq ES_R < T_U$ | | BACKWARD COMPTON SCATTERING [THE CASE OF Fig.2C] |

Fig. 10

| $DX_i$ | $FX_i$ | $BX_{i-1}$ | $BX_i$ | $BX_{i+1}$ | $CX_{i-1}$ | $CX_i$ | $CX_{i+1}$ | OUTPUT | STATE OF COMPTON SCATTERING |
|---|---|---|---|---|---|---|---|---|---|
| 1 | 1 | 0 | 1 | 0 | 0 | 1 | 0 | $RX_i(1)=1$ | Fig.1A OR Fig.2A |
| 1 | 1 | 1 | 0 | 0 | 1 | 1 | 0 | $RX_i(2)=1$ | Fig.1B |
| 1 | 1 | 0 | 0 | 1 | 0 | 1 | 1 | $RX_i(3)=1$ | Fig.1C |
| 1 | 1 | 0 | 0 | 0 | 1 | 1 | 0 | $RX_i(4)=1$ | Fig.2B |
| 1 | 1 | 0 | 0 | 0 | 0 | 1 | 1 | $RX_i(5)=1$ | Fig.2C |
| OTHERWISE | | | | | | | | 0 | |

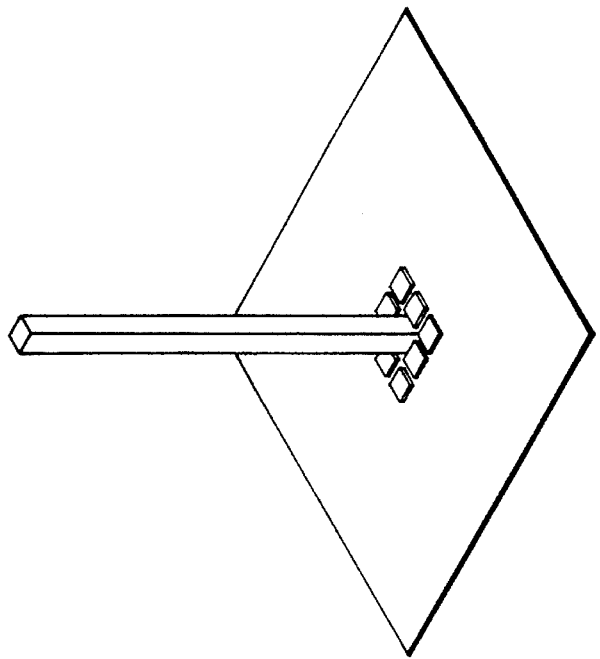

Fig.11A

POSITION DETECTION RESULTS
WITH THE PRESENT INVENTION

CONDITIONS $\begin{pmatrix} \text{SCINTILLATOR SIZE:3mm}\times\text{3mm}\times\text{30mm} \\ \text{ENERGY DISCRIMINATION:350keV} \\ T_U = 340\text{keV} \\ T_L = 50\text{keV} \\ E = 511\text{keV} \end{pmatrix}$

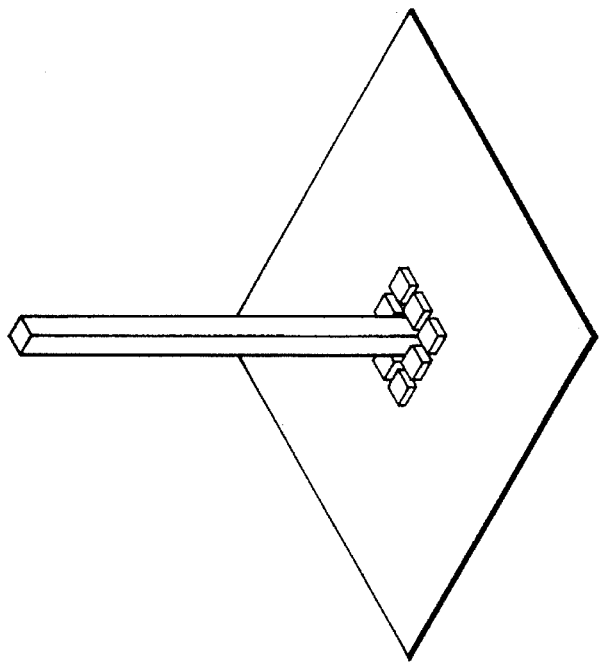

Fig.11B

POSITION DETECTION RESULTS
WITH THE PRESENT INVENTION

CONDITIONS $\begin{pmatrix} \text{SCINTILLATOR SIZE:1mm}\times\text{1mm}\times\text{30mm} \\ \text{ENERGY DISCRIMINATION:350keV} \\ T_U = 340\text{keV} \\ T_L = 50\text{keV} \\ E = 511\text{keV} \end{pmatrix}$

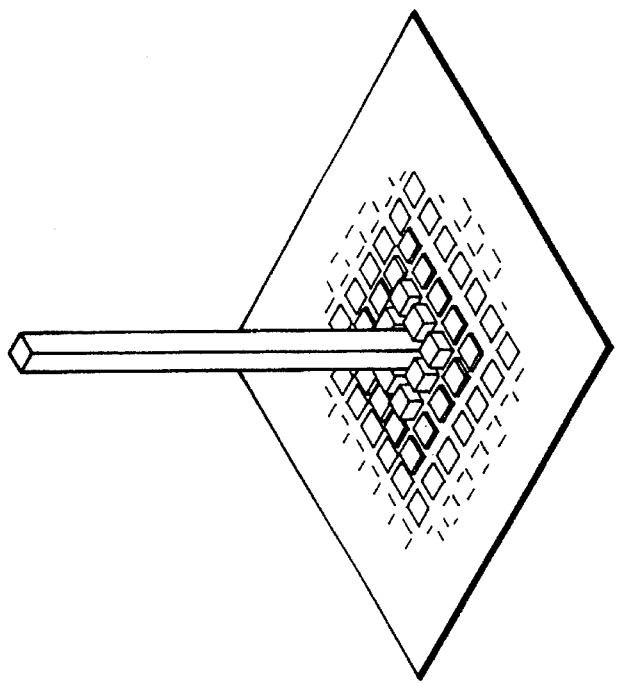

Fig. 12A

POSITION DETECTION RESULTS BY CENTROID POSITION CALCULATION

CONDITIONS $\begin{pmatrix} \text{SCINTILLATOR SIZE}: 3\text{mm} \times 3\text{mm} \times 30\text{mm} \\ \text{ENERGY DISCRIMINATION}: 350\text{keV} \\ E = 511\text{keV} \end{pmatrix}$

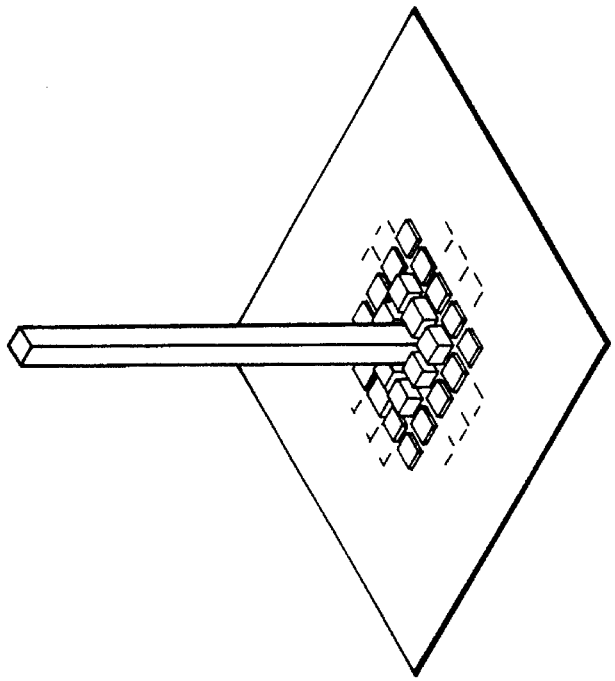

Fig. 12B

POSITION DETECTION RESULTS BY CENTROID POSITION CALCULATION

CONDITIONS $\begin{pmatrix} \text{SCINTILLATOR SIZE}: 1\text{mm} \times 1\text{mm} \times 30\text{mm} \\ \text{ENERGY DISCRIMINATION}: 350\text{keV} \\ E = 511\text{keV} \end{pmatrix}$

RADIATION SITE DETECTING APPARATUS

BACKGROUND OF THE INVENTION

1. Field of the Invention

The present invention is concerned with an apparatus to obtain a tomographic image of a detected matter by introducing radioisotopes (RI) into the matter and then detecting a radiation from the radioisotopes by means of a scintillation detector or the like, and particularly relates to a radiation site detecting apparatus to detect a site where the radiation has entered the scintillation detector.

2. Related Background Art

A positron CT apparatus is known as an example of such apparatus to obtain a tomographic image of a detected matter, and has been popular as a high-level medical technique to obtain a tomographic image of a living body in which positron emission nuclei are introduced into the living body and a distribution thereof is measured by a scintillation detector.

Generally, the positron CT apparatus is equipped with a scintillation detector having a number of scintillators arranged in a ring layout, in which the body dosed with the positron emission nuclei is set. Near a positron-emitted area, a positron emitted from the positron emission nuclei is combined with an electron to disappear and two 511 keV radiation rays (γ-rays) are simultaneously emitted in opposite directions to each other. Thus, the annihilation site near the positron emission nuclei can be detected by the coincidence counting of these two radiation rays through two mutually opposed scintillatots. A tomographic image is obtained through image reconstruction based on the thus-detected data.

Further, in order to detect the annihilation site near the positron emission nuclei, a position of each radiation-entering scintillator (hereinafter, referred to simply as "incident scintillator") among a plurality of scintillators needs to be determined. The centroid position calculating method has been mainly applied in the conventional radiation site detecting apparatus.

FIG. 13 is a drawing to show an example of conventional radiation position detecting apparatus employing the above-described centroid position calculating method. The scintillation detector is provided with a scintillator array 1 having many scintillators arranged in a two-dimensional array, and two-dimensional-crossed-wire-position-sensitive photomultipliers arranged as opposed thereto on the back side of the scintillator array 1. In the two-dimensional-cross-wire-position-detection photomultipliers, wires in the X coordinate direction and in the Y coordinate direction are connected with interposed resistors. Further, an adder (adding circuit) $2x$ adds output signals $x_1$ and $x_2$ appearing at the both ends of the resistors in the X coordinate direction, and a divider (dividing circuit) $3x$ divides the output signal $x_1$ by the addition result $(x_1+x_2)$ to obtain an X-coordinate position $x_1/(x_1+x_2)$ of an incident scintillator. On the other hand, an adder (adding circuit) $2y$ adds output signals $y_1$ and $y_2$ appearing at the both ends of the resistors in the Y-coordinate direction, and a divider (dividing circuit) $3y$ divides the output signal $y_1$ by the addition result $(y_1+y_2)$ to obtain a Y-coordinate position $y_1/(y_1+y_2)$ of the incident scintillator.

However, even if Compton scattering occurs, the conventional radiation site detecting apparatus employing the centroid position calculating method calculates a centroid position of scintillations based on scattered positions. Therefore, it was impossible to precisely detect a scintillator which a specific radiation has first entered. It is general that the size of each scintillators in the scintillator array 1 shown in FIG. 13 is smaller in order to improve the spatial resolution of tomographic image. However, the size reduction of each scintillators would cause the following problem because of the Compton scattering in the radiation-entering scintillator. Scintillation occurs when part of energy is absorbed depending upon a scattered angle, but some Compton-scattered radiation could be scattered into another scintillator (different from the incident scintillator), resulting in scintillating in some scintillatots. Accordingly, if only the scintillation in the incident scintillator should be able to be detected using the two-dimensional-crossed-wire-position-sensitive photomultipliers, the spatial resolution of a tomographic image could have been improved. However, since scintillations also occur in some other scintillators, the centroid position calculating method inevitably causes a decrease in precision of position detection.

SUMMARY OF THE INVENTION

The present invention has been accomplished under such circumstances that there was difficulty in improving the spatial resolution. Therefore, an object of the present invention is to provide a radiation site detecting apparatus which can detect a position of an incident scintillator with high precision while excluding the effect of Compton scattering.

In order to accomplish such an object, an apparatus of the present invention is provided with a scintillator array having a plurality of scintillators into which a radiation is made incident, a photodetector for photoelectrically converting scintillations occurring in the scintillators in the scintillator array, into independent photoelectric conversion signals to output them, comparing means for comparing a level of each of the photoelectric conversion signals corresponding to a specific scintillator to be detected whether the radiation has been incident thereinto and a plurality of scintillators placed around said specific scintillator, with a window range defined by a plurality of threshold values different from one another to judge whether the level is inside or outside the window range, and position detecting means for determining whether said specific scintillator is a scintillator into which the radiation has been incident, based on characteristics of a signal pattern corresponding to the photoelectric conversion signals compared in the comparing means.

Further, another position detecting means is so arranged that, based on the characteristics of the signal pattern corresponding to the photoelectric conversion signals compared in the comparing means, a decision is made as to if said specific scintillator is a scintillator into which the radiation has been incident and that if the decision is affirmative, a state of Compton scattering is detected based on the characteristics of the signal pattern corresponding to the photoelectric conversion signals.

Furthermore, the plurality of threshold values are selected as a first threshold value corresponding to energy a little bit higher than maximum energy lost upon the Compton scattering and a second threshold value corresponding to energy a little bit higher than energy of cross talk between output terminals of photodetectors.

In the apparatus according to the present invention in the structure as described above, objects to be detected are the plurality of photoelectric conversion signals corresponding to the specific scintillator a position of which should be detected and the scintillators around the specific scintillator. Accordingly, if a radiation enters the specific scintillator to be Compton-scattered, a scintillation occurs not only in the specific scintillator but also in the scintillators around the specific scintillator, whereby the plurality of photoelectric conversion signals should contain information about the scintillation in the specific scintillator and about the scintillation in the scintillators around the specific scintillator, caused by the Compton scattering. Thus, each of the photoelectric conversion signals is compared with the window preliminarily set, to extract characteristics of emission intensity pattern based on the specific scintillator from the comparing means, whereby based on the feature-extracted pattern, the position detecting means makes a decision as to if the specific scintillator is a scintillator into which the radiation has been incident. Since this feature-extracted pattern has different characteristics in accordance with a state of the Compton scattering, a state of the Compton scattering can be determined from the pattern.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1A, FIG. 1B and FIG. 1C are explanatory drawings to illustrate the radiation site detecting principle of the present invention;

FIG. 2A, FIG. 2B and FIG. 2C are explanatory drawings to further illustrate the radiation site detecting principle of the present invention;

FIG. 5 is an explanatory drawing to show a correlation between Compton scattering states and the window;

FIG. 10 is a table of truth values to illustrate an operation of a position detecting unit;

FIG. 11A and FIG. 11B are explanatory drawings to show evaluation results of an embodiment;

FIG. 12A and FIG. 12B are explanatory drawings to show evaluation results of a conventional technique.

DETAILED DESCRIPTION OF THE PREFERRED EMBODIMENT

An embodiment of the present invention will be described with reference to the drawings. First, the principle of the present invention is described in detail.

Figure 13:
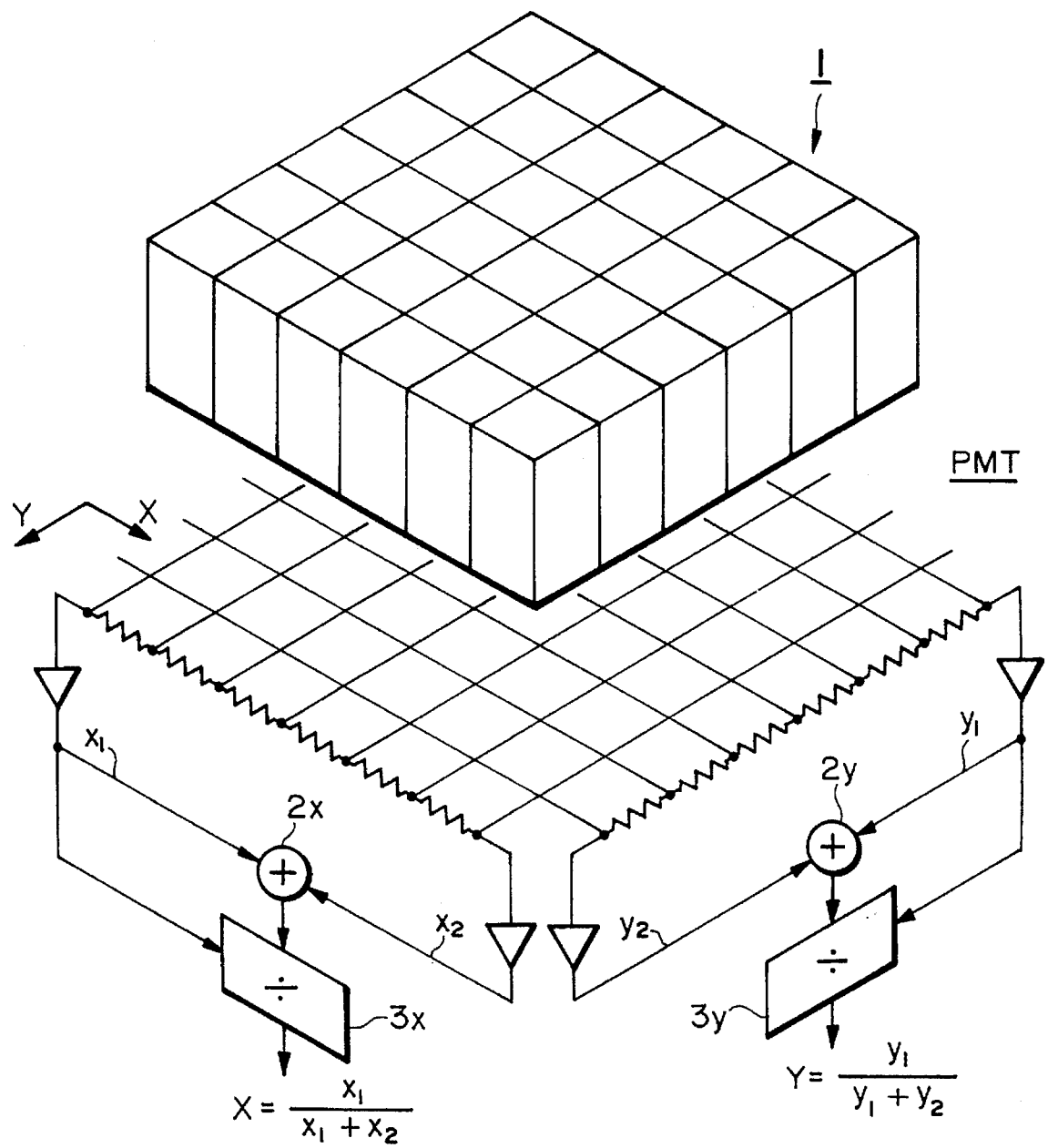
FIG. 13 is an explanatory drawing to show the structure of a conventional radiation site detecting apparatus.

In case the size of each scintillator in the scintillator array as shown in FIG. 13 is smaller, and if a γray is Compton-scattered in an incident scintillator, a scintillation appears not only in the incident scintillator but also in other scintillators adjacent to the incident scintillator due to the scattered γray. Therefore, the position of the incident scintillator which is to be detected cannot be specified by simple detection of scintillations. Accordingly, the spatial resolution of a tomographic image cannot be improved by the conventional technique. Under the circumstances, characteristics of the Compton scattering phenomenon in the incident scintillator have been studied so as to accomplish the present invention.

First, the occurrence probability of Compton scattering Pc depends on energy E of a γray incident into a scintillator, and a material and a density of the scintillator. For example, in case of a positron CT apparatus, Pc=56% where E=511 keV and BGO is used for the scintillator.

Further, the Compton scattering can be classified into two types, i.e., forward Compton scattering in which scattering occurs in a forward direction with respect to the incident direction of the γray, as shown in FIGS. 1A–1C, (where a scattering angle is acute) and backward Compton scattering in which scattering occurs in a backward direction with respect to the incident direction of the γray, as shown in FIGS. 2A–2C, (where a scattering angle is obtuse).

States of the Compton scattering each are further described in detail with reference to FIGS. 1A–1C and FIGS. 2A–2C. Here, each drawing shows a state of Compton scattering in scintillators together with a corresponding energy distribution in the scintillators, $ES_C$, $ES_R$ or $ES_L$, as caused by the Compton scattering. There are three cases as to the forward Compton scattering: i.e., a case in which a γray forward-Compton-scattered in an incident scintillator $S_C$ (hereinafter, a scintillator which a γray has first entered will be referred to as an incident scintillator) is stopped in the incident scintillator $S_C$ through the photoelectric absorption, as shown in FIG. 1A; a case in which a γray forward-Compton-scattered in the incident scintillator $S_C$ goes into another adjacent scintillator $S_L$ on the left side and is stopped through the photoelectric absorption, as shown in FIG. 1B; and a case in which a γray forward-Compton-scattered in the incident scintillator $S_C$ goes into another adjacent scintillator $S_R$ on the right side and is stopped through the photoelectric absorption, as shown in FIG. 1C.

On the other hand, there are three cases as to the backward Compton scattering: i.e., a case in which a γray backward-Compton-scattered in the incident scintillator $S_C$ is stopped in the incident scintillator $S_C$ through the photoelectric absorption, as shown in FIG. 2A; a case in which a γray backward-Compton-scattered in the incident scintillator $S_C$ goes into another adjacent scintillator $S_L$ on the left side and is stopped through the photoelectric absorption, as shown in FIG. 2B; and a case in which a γray backward-Compton-scattered in the incident scintillator $S_C$ goes into another adjacent scintillator $S_R$ on the right side and is stopped through the photoelectric absorption, as shown in FIG. 2C.

The Compton scattering occurrence probability depending upon the scattering angle θ (i.e., the scattering angle distribution probability) P can be calculated by the Klein-Nishina equation, and scattered γray energy $E_S$ and recoil electron energy $E_{RE}$ (energy given to the scattered point) can be obtained based on the energy conservation law. Namely, $$P \propto \left[ \frac{1}{1+\frac{E}{mc^2}(1-\cos\theta)} \right]^3 * \left[ \frac{1+\cos^2\theta}{2} \right] * \left[ 1 + \frac{\left(\frac{E}{mc^2}\right)^2 (1-\cos\theta)^2}{(1+\cos^2\theta)\left[1+\frac{E}{mc^2}(1-\cos\theta)\right]} \right] \quad (1)$$

$$E_S = \frac{E}{1+\frac{E}{mc^2}(1-\cos\theta)} \quad (2)$$

$$E_{RE} = E - E_S \quad (3)$$

Further, in case of the positron CT apparatus, the γ ray energy $E=mc^2=511$ keV. Thus, when these values are substituted into the above formulas (1)–(3), the following formulas are obtained.

$$P \propto \left[ \frac{1}{2-\cos\theta} \right]^3 * \left[ \frac{1+\cos^2\theta}{2} \right] * \left[ 1 + \frac{(1-\cos\theta)^2}{(1+\cos^2\theta)(2-\cos\theta)} \right] \quad (4)$$

$$E_S = E/(2-\cos\theta) \quad (5)$$
$$E_{RE} = E(1-\cos\theta)/(2-\cos\theta). \quad (6)$$

Figure 3:
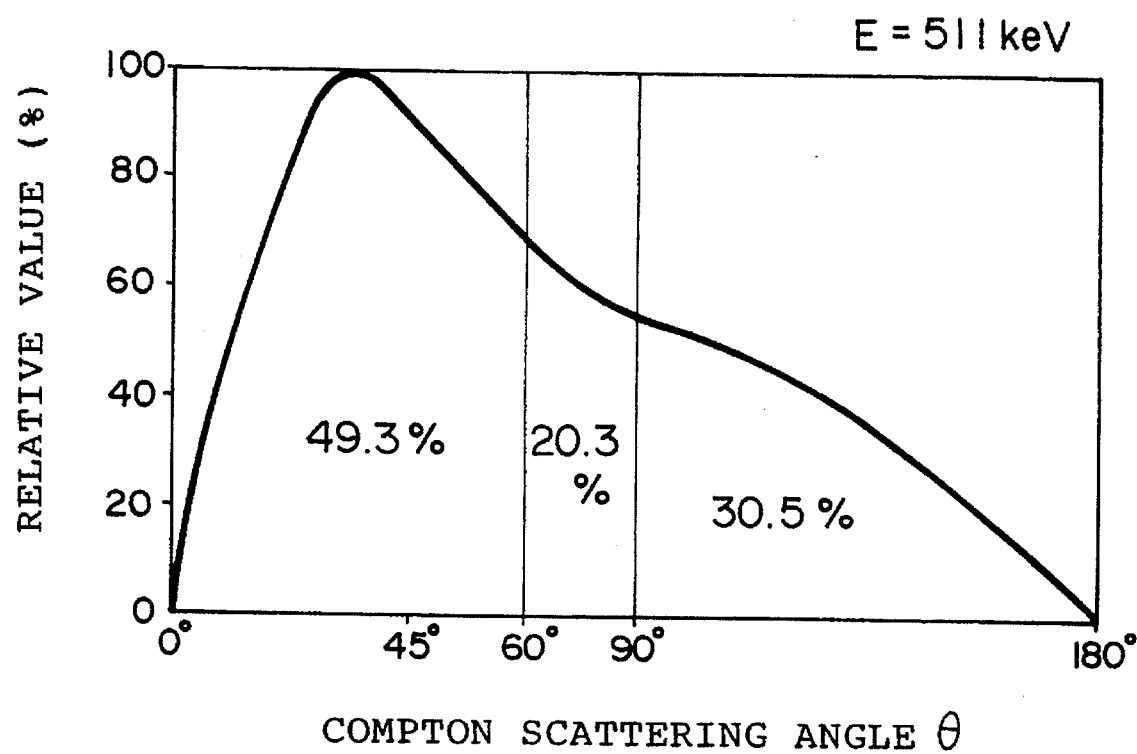
FIG. 3 is an explanatory drawing to illustrate the Compton scattering phenomenon occurring in a scintillator.
Figure 4:
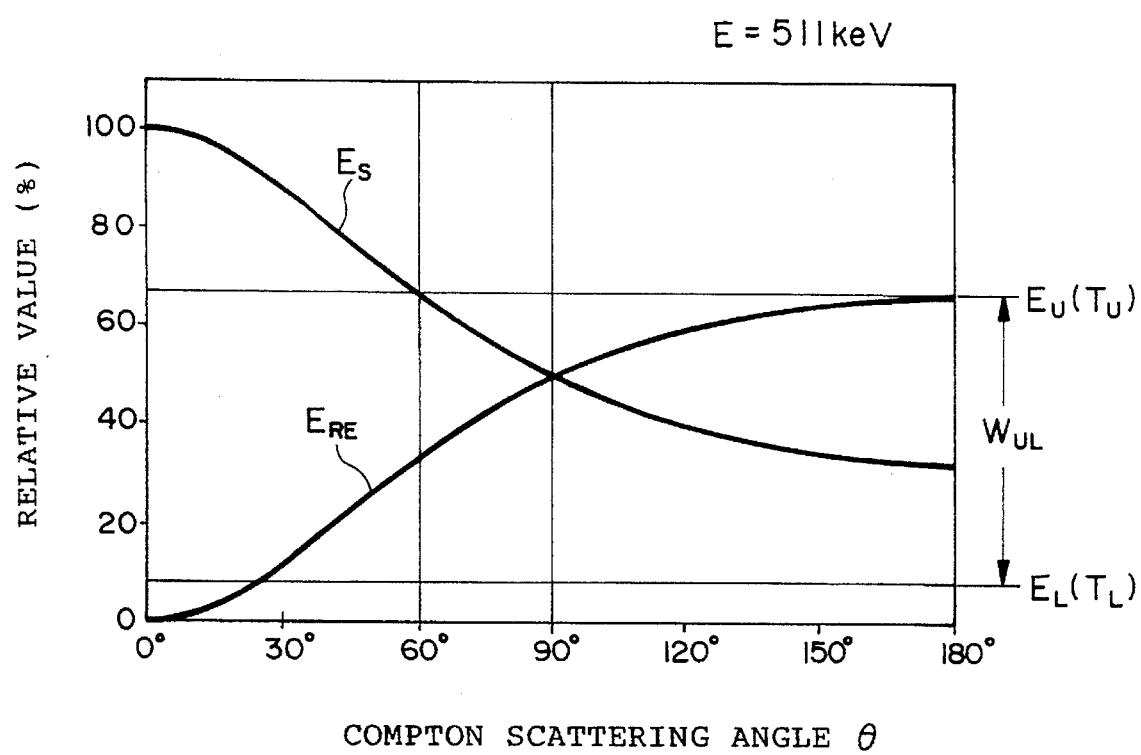
FIG. 4 is an explanatory drawing to illustrate setting conditions of a window set in the present invention.

According to the above formula (4), the Compton scattering angle distribution probability (of γ ray) where the γ ray energy E is 511 keV is as shown in FIG. 3. In FIG. 3, the abscissa represents scattering angles θ and the ordinate relative values with the maximum occurrence probability being defined as 100%. Since a sum of occurrence probabilities in the range of $0° \leq \theta \leq 60°$ is about 49.3%, a sum of occurrence probabilities in the range of $60° \leq \theta \leq 90°$ is about 20.3% and a sum of occurrence probabilities in the range of $90° \leq \theta \leq 180°$ is about 30.5%, a total occurrence probability of the forward Compton scattering is higher in the positron CT apparatus. Further, FIG. 4 shows distributions based on the above formulas (5) and (6). In FIG. 4, the abscissa represents scattering angles θ and the ordinate relative values of the scattered γ ray energy $E_S$ and the recoil electron energy $E_{RE}$ with the maximum value of the scattered γ ray energy $E_S$ being defined as 100%.

It should be noted in FIG. 4 that the scattered γ ray energy $E_S$ is larger than the recoil electron energy $E_{RE}$ ($E_S > E_{RE}$) in case of the forward Compton scattering as shown in FIGS. 1A–1C. Namely, energy absorbed at a next-reaching point is larger than that given to the scattered point, and the energy difference between them, $\Delta(=|E_S-E_{RE}|)$, is large. On the other hand, in case of the backward Compton scattering as shown in FIGS. 2A–2C, the scattered γ ray energy $E_S$ is smaller than the recoil electron energy $E_{RE}$ ($E_S < E_{RE}$). Namely, the energy absorbed at a next-reaching point is smaller than that given to the scattered point, and the energy difference between them, $\Delta(=|E_{RE}-E_S|)$, is smaller as compared with the case of forward Compton scattering. Furthermore, the relation in relative value between the scattered γ ray energy $E_S$ and the recoil electron energy $E_{RE}$ is inverted at the scattering angle of about θ=90°.

In other words, noting the relation of energy $E_S$ and energy $E_{RE}$ and the relation of energy difference Δ, it can be said that if the light emission intensity based on the recoil electron energy $E_{RE}$ in the incident scintillator $S_C$ is smaller than the emission intensity based on the absorption of the scattered γ ray energy $E_S$ in another adjacent scintillator and if the energy difference $\Delta=|E_S-E_{RE}|$ is large, the scattering is either one of the cases of forward Compton scattering (for example, either case of FIGS. 1B and 1C). On the other hand, if the emission intensity based on the recoil electron energy $E_{RE}$ in the incident scintillator $S_C$ is larger than the emission intensity based on the scattered γ ray energy $E_S$ in another adjacent scintillator and if the energy difference $\Delta(=|E_{RE}-E_S|)$ is small, the scattering is either one of the cases of backward Compton scattering (for example, either case of FIGS. 2B and 2C). Furthermore, in case strong emission occurs only in the incident scintillator $S_C$, the incident scintillator $S_C$ can be clearly discriminated (for example, in case of FIGS. 1A and 2A).

Accordingly, in the present invention the position of the incident scintillator is determined utilizing the characteristics of the scattered γ ray energy $E_S$ and the recoil electron energy $E_{RE}$ as shown in FIG. 4. First, as shown in FIG. 4, preliminarily set are a first threshold value $T_U$ corresponding to a first energy level $E_U$, a second threshold value $T_L$ corresponding to a second energy level $E_L$ (provided that $T_L < T_U$), and a window $W_{UL}$ corresponding to an energy range between the first and second energy levels $E_U$ and $E_L$ (namely, the range between the first and second threshold values $T_U$ and $T_L$).

Here, it is preferred that the first threshold value $T_U$ and the second threshold value $T_L$ are so set that in case of the backward Compton scattering both the scattered γ ray energy $E_S$ and recoil electron energy $E_{RE}$ are included in the range of window $W_{UL}$ and that in case of the forward Compton scattering the scattered γ ray energy $E_S$ is outside the range of window $W_{UL}$ and the recoil electron energy $E_{RE}$ is within the range of window $W_{UL}$.

Then, an emission intensity of light in scintillation of a radiation is detected in each scintillator by means of a photodetector such as a photomultiplier, and each emission intensity is compared with the first threshold value $T_U$ and the second threshold value $T_L$, whereby it is checked about the following points: the detected scattering belongs to which range of scattering angle θ in the distributions of scattered γ ray energy $E_S$ and the recoil electron energy $E_{RE}$ as shown in FIG. 4; and further, based on the window $W_{UL}$, the scattering belongs to which case of the forward and backward Compton scatterings. Then, the incident scintillator can be specified by selecting one from the cases of the Compton scattering shown in FIGS. 1A–1C and FIGS. 2A–2C.

FIG. 5 shows an example of judgment conditions and judgment results to specify the incident scintillator $S_C$ as shown in FIGS. 1A–1C and FIGS. 2A–2C, based on the above judgment principle.

As described above, the present invention is based on such a concept that an emission intensity of light appearing in each scintillator in the scintillator array is detected by a photodetector and that the incident scintillator is specified by comparing levels and ranges of emission intensities with the predetermined threshold values and window preliminarily set based on the Compton scattering characteristics. As a result, the present invention can achieve position detection of incident scintillator with high precision by removing the effect of Compton scattering, even if the Compton scattering occurs unavoidably in the scintillators.

Figure 6:
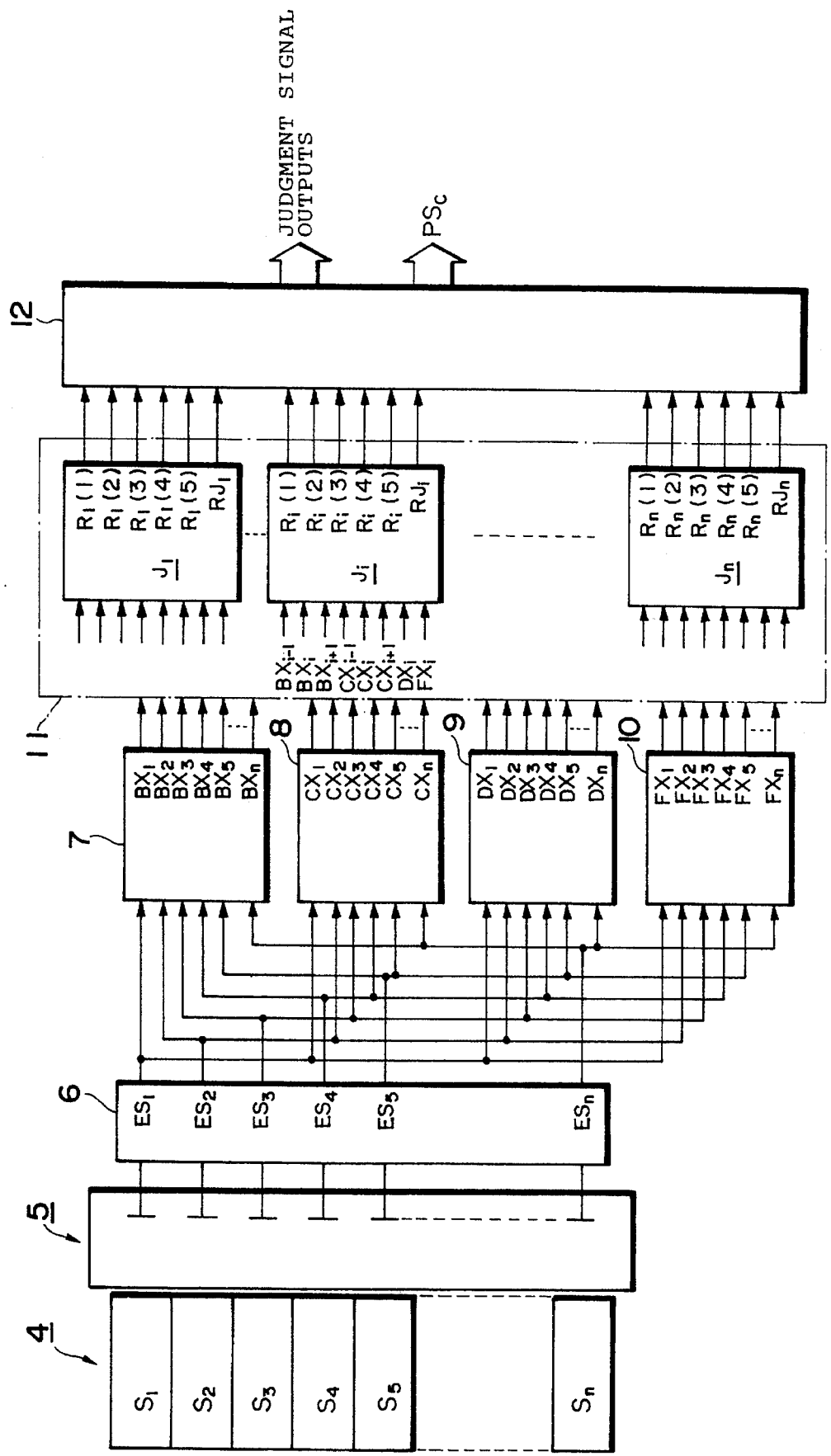
FIG. 6 is a block diagram to show the structure of an embodiment of the present invention.

Next described with reference to the drawings is a more specific embodiment of radiation position detecting apparatus according to the present invention. The present embodiment is an example of positron CT apparatus (PET) to which the invention is applied. FIG. 6 is a block diagram to show the overall structure of the radiation position detecting apparatus employing the scintillation detecting unit, and FIGS. 7 and 8 are circuit diagrams to show principal parts of FIG. 6 in detail.

In FIG. 6, a scintillation detector comprises a scintillator array 4 composed of m×n scintillators in a two-dimensionally arranged-matrix and a photodetector 5 employing a photomultiplier having m×n detector units for detecting light generated in the scintillators. Further, the scintillation detector is so arranged that photoelectric conversion signals output from detection terminals corresponding to the respective scintillators in the photodetector 5 are signal-processed, to determine a position of a specific incident scintillator. For convenience' sake of illustration, FIG. 6 shows, as a representative example, a case where the position detection is made for n scintillators $S_1$–$S_n$ aligned along a certain direction and the signal processing is done for photoelectric conversion signals output from n corresponding detection terminals in the photodetector 5.

Figure 7:
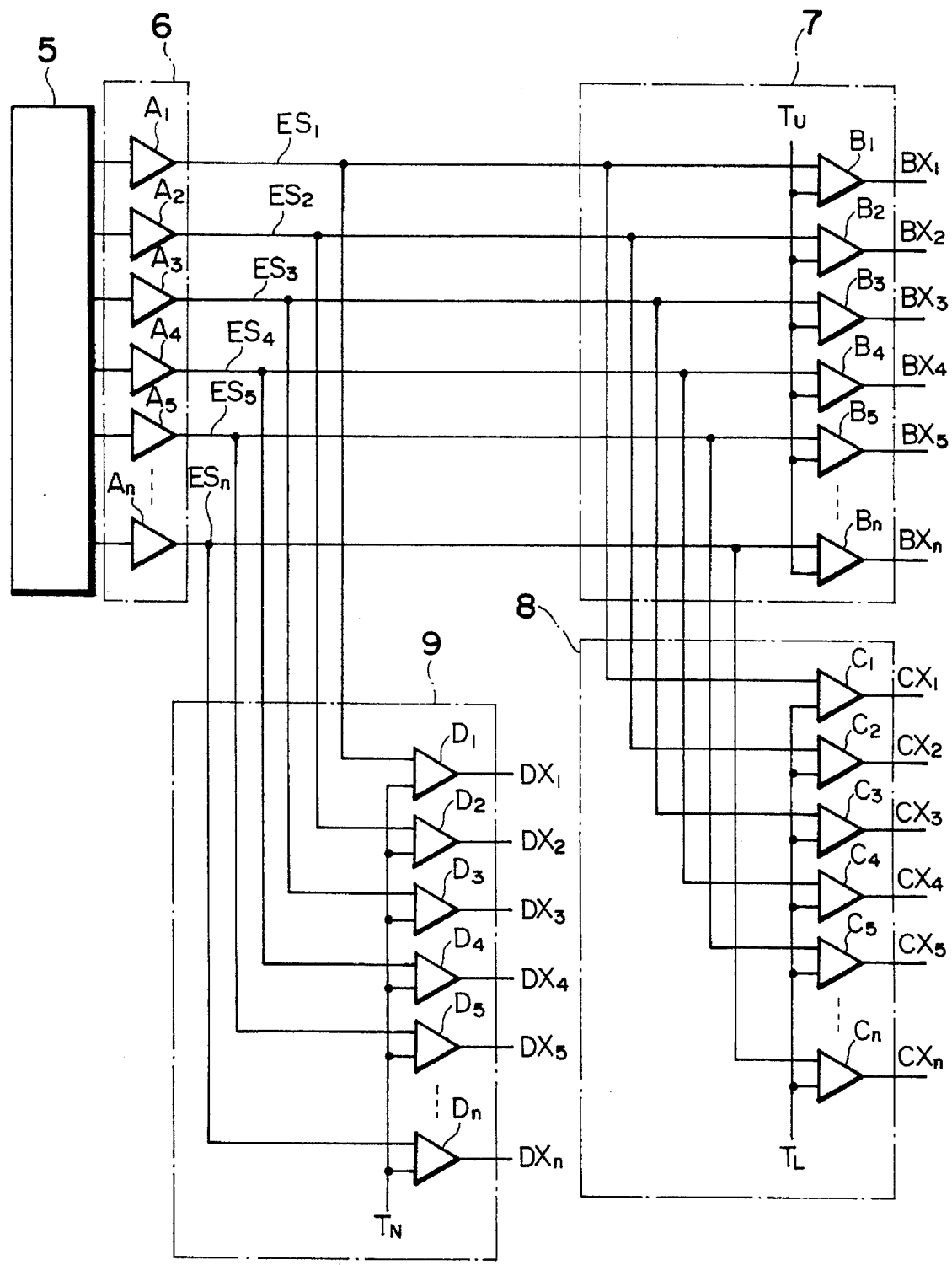
FIG. 7 is a circuit diagram to specifically show the structure in FIG. 6.
Figure 8:
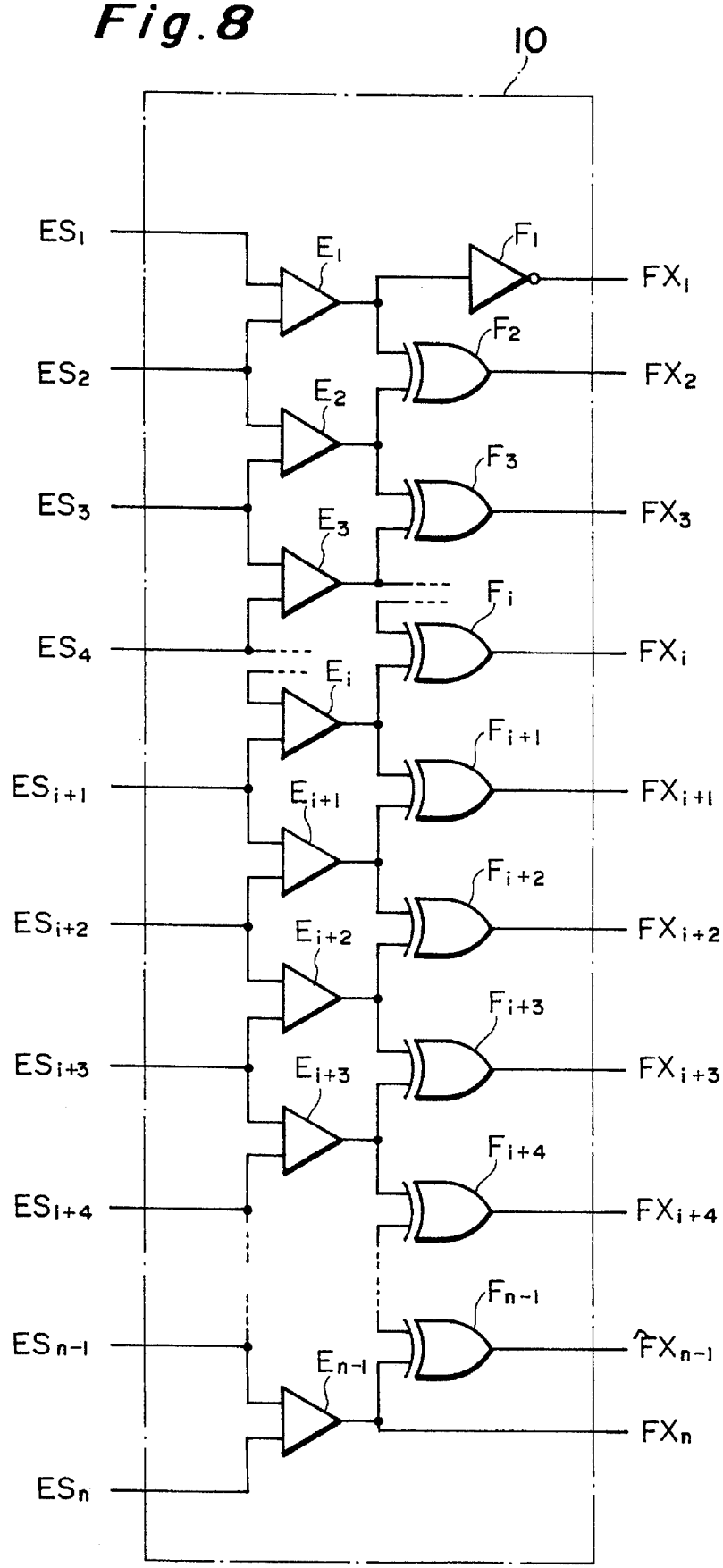
FIG. 8 is a circuit diagram to further specifically show the structure in FIG. 6.

A preamplifier unit 6 has n preamplifiers $A_1$–$A_n$, which amplify n photoelectric conversion signals output from the n detection terminals in parallel to output n signals $ES_1$–$ES_n$ for signal-processing (see FIG. 7).

A first comparing unit 7 compares an amplitude level of each signal $ES_1$–$ES_n$ with the first threshold value $T_U$ and outputs comparison output signals $BX_1$–$BX_n$, each of which indicates logic "1" if it is a signal with a larger amplitude than the threshold value $T_U$ or logic "0" if it is a signal with a smaller amplitude than the threshold value $T_U$. For example, as shown in FIG. 7, the first comparing unit 7 is composed of n comparators $B_1$–$B_n$, to one input terminals of which the threshold value $T_U$ is applied and to the other input terminals of which respective signals $ES_1$–$ES_n$ are input.

A second comparing unit 8 compares an amplitude level of each signal $ES_1$–$ES_n$ with the second threshold value $T_L$ (provided that $T_L < T_U$) and outputs comparison output signals $CX_1$–$CX_n$, each of which indicates logic "1" if it is a signal with a larger amplitude than the threshold value $T_L$ or logic "0" if it is a signal with a smaller amplitude than the threshold value $T_L$. For example, as shown in FIG. 7, the second comparing unit 8 is composed of n comparators $C_1$–$C_n$, to one input terminals of which the threshold value $T_L$ is applied and to the other input terminals of which respective signals $ES_1$–$ES_n$ are input.

A noise component removing unit 9 compares the signals $ES_1$–$ES_n$ with a third threshold value $T_N$ (preliminarily set at a level slightly higher than the noise level) so as to invalidate a result of comparison in a noise component region in the signals $ES_1$–$ES_n$, which is a region without actual signal input, and outputs comparison output signals $DX_1$–$DX_n$ indicating logic "1" only for signals with a larger amplitude than those of noise components but logic "0" for signals equivalent to the noise components. For example, as shown in FIG. 7, the noise component removing unit 9 is composed of n comparators $D_1$–$D_n$, to one input terminals of which the common threshold value $T_N$ is applied and to the other input terminals of which respective signals $ES_1$–$ES_n$ are input.

An envelope extracting unit 10 characteristic-extracts an increase-or-decrease tendency of an overall amplitude envelope of signals $ES_1$–$ES_n$ to output envelope signals $FX_1$–$FX_n$, in order to detect which scintillator gave the largest output. For example, as shown in FIG. 8, the envelope extracting unit 10 is provided with n−1 comparators $E_1$–$E_n$ to compare amplitudes of two mutually adjacent output signals out of the output signals $ES_1$–$ES_n$ with each other, n−1 Ex-OR gates $F_2$–$F_n$ to perform the exclusive-OR operation for signals $EX_1$–$EX_{n-1}$ appearing at two mutually adjacent output ends out of the comparators $E_1$–$E_{n-1}$, and an invertor $F_1$, as arranged to output the envelope signals $FX_1$–$FX_n$.

Figure 9:
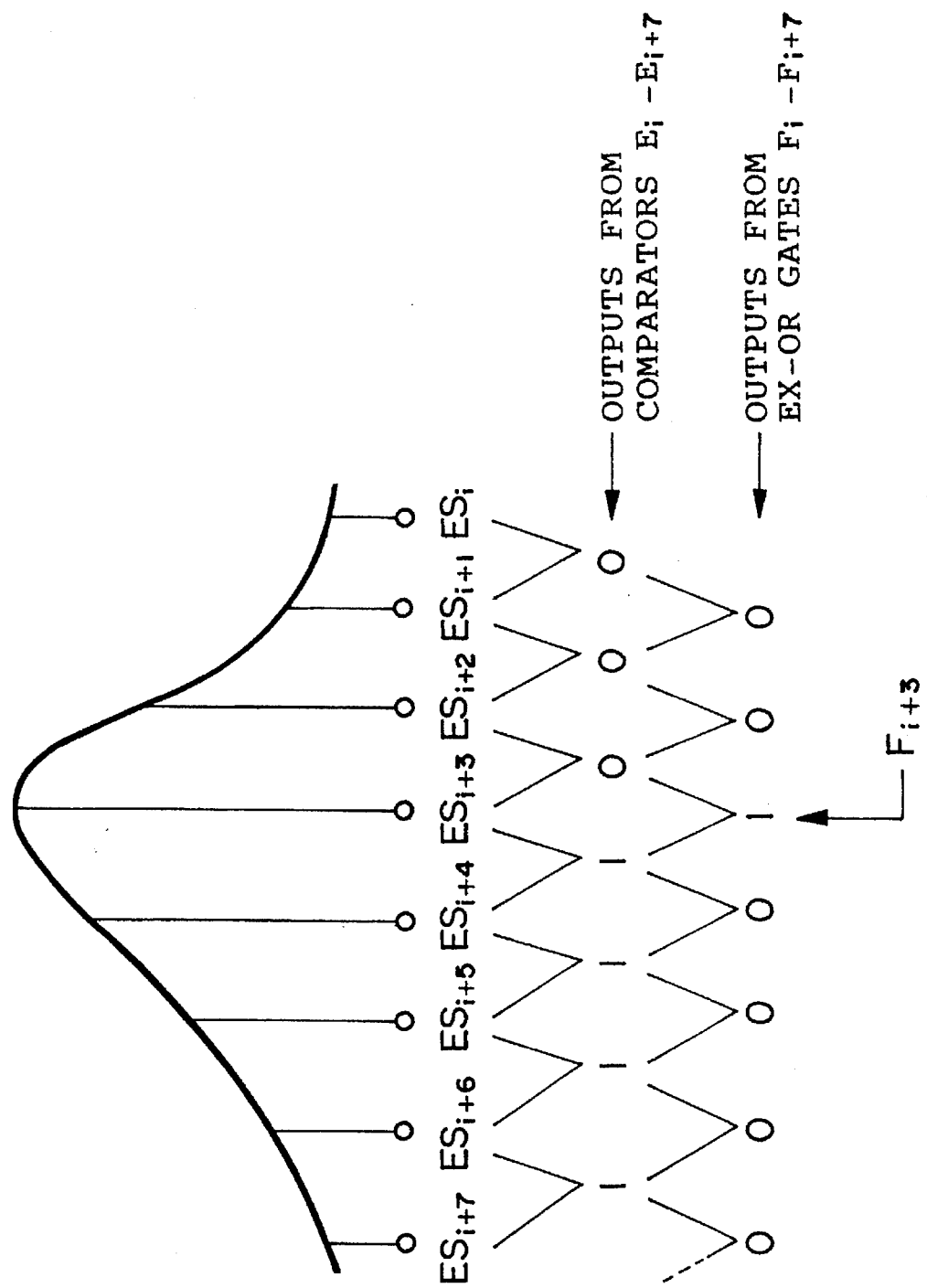
FIG. 9 is an explanatory drawing to illustrate an operation of an envelope extracting unit.

For example, describing a typical case where signals $ES_i$–$ES_{i+7}$, having a convex envelope distribution with the (i+3)th signal $ES_{i+3}$ being the maximum, are input into the envelope extracting unit 10, as shown in FIG. 9, output signals of the comparators are "1" on one side and "0" on the other side with respect to the output signal $EX_{i+3}$ as the boundary. Further, only the output signal $FX_{i+3}$ of the Ex-OR gate $F_{i+3}$ becomes logic "1", so that the envelope distribution can be detected.

A position detecting unit 11 detects the position of incident scintillator $S_C$ by performing an operation based on a predetermined algorithm with the comparison output signals $BX_1$–$BX_n$ and $CX_1$–$CX_n$ output from the first and second comparing units 7 and 8, the noise detection signals $DX_1$–$DX_n$ output from the noise component removing unit 9 and the envelope signals $FX_1$–$FX_n$ output from the envelope extracting unit 10. Further, the position detecting unit 11 is provided with n processing units $J_1$–$J_n$ in order to judge whether each scintillator $S_1$–$S_n$ is the incident scintillator $S_C$ or not.

Let us examine a representative case with the processing unit $J_i$ corresponding to the i-th scintillator $S_i$. The (i−1)th to the (i+1)th comparing output signals $BX_{i-1}$, $BX_i$ and $BX_{i+1}$ output from the first comparing unit 7, the (i−1)th to the (i+1)th comparison output signals $CX_i−1$, $CX_i$ and $CX_i+1$ output from the second comparing unit 8, the i-th noise detection signal $DX_i$ and the envelope signal $FX_i$ are input into the processing unit $J_i$, and then the processing unit $J_i$ judges, based on the logic pattern thus obtained, whether the i-th scintillator $S_i$ is the incident scintillator or not and which state among the six types of Compton scattering states as shown in FIGS. 1A–1C, 2A–2C and 5 corresponds to it. The above judgment is carried out based on the following logic operation formulas (7)–(11) and a table of truth values therefor is given in FIG. 10.

$$RX_i(1) = DX_i \cdot FX_i \cdot \overline{BX_{i-1}} \cdot BX_i \cdot \overline{BX_{i+1}} \cdot \overline{CX_{i-1}} \cdot CX_i \cdot \overline{CX_{i+1}} \tag{7}$$

$$RX_i(2) = DX_i \cdot FX_i \cdot BX_{i-1} \cdot \overline{BX_i} \cdot \overline{BX_{i+1}} \cdot CX_{i-1} \cdot CX_i \cdot \overline{CX_{i+1}} \tag{8}$$

$$RX_i(3) = DX_i \cdot FX_i \cdot \overline{BX_{i-1}} \cdot \overline{BX_i} \cdot BX_{i+1} \cdot \overline{CX_{i-1}} \cdot CX_i \cdot CX_{i+1} \tag{9}$$

$$RX_i(4) = DX_i \cdot FX_i \cdot \overline{BX_{i-1}} \cdot \overline{BX_i} \cdot \overline{BX_{i+1}} \cdot CX_{i-1} \cdot CX_i \cdot \overline{CX_{i+1}} \tag{10}$$

$$RX_i(5) = DX_i \cdot FX_i \cdot \overline{BX_{i-1}} \cdot \overline{BX_i} \cdot \overline{BX_{i+1}} \cdot \overline{CX_{i-1}} \cdot CX_i \cdot CX_{i+1} \tag{7}$$

Here, a case of the first judgment signal RXi(1) being logic "1" corresponds to the case as shown in FIG. 1A or FIG. 2A; a case of the second judgment signal RXi(2) being logic "1" corresponds to the case as shown in FIG. 1B; a case of the third judgment signal RXi(3) being logic "1" corresponds to the case as shown in FIG. 1C; a case of the fourth judgment signal RXi(4) being logic "1" corresponds to the case as shown in FIG. 2B; and a case of the fifth judgment signal RXi(5) being logic "1" corresponds to the case as shown in FIG. 2C. Further, only one out of the first to fifth judgment signals RXi(1)–RXi(5) can be logic "1", so that these signals output from the processing unit $J_i$ can represent either one of the states as shown in FIGS. 1A–1C and FIGS. 2A–2C.

Furthermore, the processing unit $J_i$ executes a logical sum (OR) operation of the first to fifth judgment signals RXi(1)–RXi(5) to output an OR output signal $RJ_i$. Then, if the OR output signal $RJ_i$ is logic "1", the scintillator $S_i$ corresponding to the i-th processing unit $J_i$ is the incident scintillator $S_C$.

As explained using the i-th processing unit $J_i$ as the representative, the rest processing units $J_1$–$J_{i-1}$ and $J_{i+1}$–$J_n$ have the same structures as the processing unit $J_i$, and the position detecting unit 11 is thus provided with n processing units $J_1$–$J_n$ corresponding to the n scintillators $S_1$–$S_n$.

Again in FIG. 6, an encoding unit 12 has a built-in encoding circuit for encoding OR output signals $RJ_1$–$RJ_n$ output from the processing units $J_1$–$J_n$, to coded data $PS_C$ of binary codes, for example, and therefore the position of the incident scintillator $S_C$ is specified by the coded data $PS_C$. Further, the above-described first to fifth judgment signals output from the respective processing units $J_1$–$J_n$ are output through the encoding unit 12.

For the purpose of illustration, the radiation site detection was described with the one-dimensionally arranged scintillators $S_1$–$S_N$. Likewise, with a scintillator array having m×n scintillators two-dimensionally arranged, a radiation site detecting apparatus can be constructed in similar structure.

FIGS. 11A and 11B are drawings to show judgment results of position detection of the incident scintillator $S_C$ according to the present embodiment, and FIGS. 12A and 12B are drawings to show judgment results of position detection of the incident scintillator $S_C$ by the conventional barycenter calculation method. These judgment results were obtained by the Monte Carlo simulation with the same scintillation detector and under the same conditions. Detection probabilities for two-dimensionally arranged scintillators are shown as a distribution in the form of bar graph. Further, in FIGS. 11A–11B and FIGS. 12A–12B, the peak portion corresponds to the position of actual (true) incident scintillator $S_C$ and the distribution around the peak corresponds to the positions of scintillatots which were erroneously judged as to be the incident scintillator $S_C$ due to the Compton scattering. Also, each peak is normalized.

Comparing these evaluation results, the present embodiment shows (in FIGS. 11A–11B) that the detection probabilities for the scintillators around the incident scintillator $S_C$ are extremely low as compared with that of the incident scintillator $S_C$ and that the dispersion of probability distribution is narrow. On the other hand, the conventional case shows (in FIGS. 12A–12B) that the detection probabilities for the scintillators around the incident scintillator $S_C$ are not so low as compared with that of the incident scintillator $S_C$ and that the dispersion of probability distribution is wide. Accordingly, it was verified that the present invention improved the detection precision for the incident scintillator $S_C$ and the spatial resolution of a tomographic image.

The above embodiment illustrated an application to a detector in a positron CT apparatus (PET), but the present invention can be also applied to a detector in SPECT. Namely, the detector for SPECT may be so arranged that, for example, a collimator is added in front of the scintillator array 4 as shown in FIG. 6 and a radiation enters one of scintillators in the scintillator array 4 through the collimator, whereby an occurrence position of the radiation (which is an annihilation position near the positron emission nuclei) is detected. Accordingly, since the Compton scattering also occurs in the incident scintillator in SPECT as in PET, the detection precision of the incident scintillator and the spatial resolution of a tomographic image have not been able to be improved by the conventional centroid position calculation method. In contrast, applying the present invention to SPECT, the effect of the Compton scattering can be removed as illustrated in the above embodiment, whereby the detection precision of the incident scintillator and the spatial resolution of a tomographic image can be improved.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 193470/1993 filed on Aug. 4, 1993 is hereby incorporated by reference.

What is claimed is:

1. A radiation site detecting apparatus comprising:

a scintillator array having a plurality of scintillators into which a radiation is made incident;

a photodetector for photoelectrically converting scintillations occurring in the scintillators in the scintillator array into independent photoelectric conversion signals to output said signals;

comparing means for comparing, among the photoelectric conversion signals output from said photodetector, a level of each of photoelectric conversion signals corresponding to a specific scintillator to be detected whether the radiation has been incident thereinto and a plurality of scintillators placed around said specific scintillator, with a window range defined by a plurality of threshold values different from one another to judge whether the level is inside or outside the window range; and position detecting means for determining whether said specific scintillator is a scintillator into which the radiation has been incident, based on characteristics of a signal pattern corresponding to said photoelectric conversion signals compared in said comparing means.

2. A radiation site detecting apparatus comprising:

a scintillator array having a plurality of scintillators into which a radiation is made incident;

a photodetector for photoelectrically converting scintillations occurring in the scintillators in the scintillator array into independent photoelectric conversion signals to output said signals;

comparing means for comparing, among the photoelectric conversion signals output from said photodetector, a level of each of photoelectric conversion signals corresponding to a specific scintillator to be detected whether the radiation has been incident thereinto and a plurality of scintillators placed around said specific scintillator, with a window range defined by a plurality of threshold values different from one another to judge whether the level is inside or outside the window range; and position detecting means for determining whether said specific scintillator is a scintillator into which the radiation has been incident, based on characteristics of a signal pattern corresponding to said photoelectric conversion signals compared in said comparing means, and, if said specific scintillator is defined to be the scintillator into which the radiation has been incident, detecting a state of Compton scattering, based on the characteristics of the signal pattern corresponding to said photoelectric conversion signals.

3. A radiation site detecting apparatus according to claim 1 or claim 2, wherein said plurality of threshold values are a first threshold value set as corresponding to energy higher than maximum energy lost in Compton scattering and a second threshold value set as corresponding to energy higher than that of cross talk between photodetector output terminals.

* * * * *